United States Patent
Moghal

(10) Patent No.: US 10,436,976 B2
(45) Date of Patent: Oct. 8, 2019

(54) RIBS FOR SEALING AND ALIGNING AN OUTDOOR LIGHTGUIDE LUMINAIRE

(71) Applicant: Eaton Intelligent Power Limited, Dublin (IE)

(72) Inventor: Khurram Z. Moghal, Senoia, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 16/292,101

(22) Filed: Mar. 4, 2019

(65) Prior Publication Data

US 2019/0196096 A1 Jun. 27, 2019

Related U.S. Application Data

(63) Continuation of application No. 15/588,441, filed on May 5, 2017, now Pat. No. 10,222,544.

(60) Provisional application No. 62/332,437, filed on May 5, 2016.

(51) Int. Cl.
    *G02B 6/00*     (2006.01)
    *F21V 8/00*     (2006.01)
    *F21S 8/08*     (2006.01)

(52) U.S. Cl.
    CPC ............ *G02B 6/0093* (2013.01); *F21S 8/081* (2013.01); *G02B 6/009* (2013.01); *G02B 6/0055* (2013.01); *G02B 6/0068* (2013.01); *G02B 6/0083* (2013.01); *G02B 6/0088* (2013.01)

(58) Field of Classification Search
CPC .. G02B 6/0093; G02B 6/0055; G02B 6/0068; G02B 6/0083; G02B 6/0088; G02B 6/009
See application file for complete search history.

(56) References Cited

U.S. PATENT DOCUMENTS

| | | | | |
|---|---|---|---|---|
| D468,478 S ‡ | 1/2003 | Landefeld | | D26/10 |
| D499,503 S ‡ | 12/2004 | Hon | | D26/67 |
| D592,343 S ‡ | 5/2009 | Wilcox | | D26/67 |
| D670,018 S ‡ | 10/2012 | Sauvage | | D26/68 |
| D678,576 S ‡ | 3/2013 | Chen | | D26/67 |
| D713,082 S ‡ | 9/2014 | Hermansen | | D26/67 |
| D716,989 S ‡ | 11/2014 | Sooferian | | D26/68 |
| D741,548 S ‡ | 10/2015 | Ladewig | | D28/67 |
| D748,315 S ‡ | 1/2016 | Ladewig | | D26/67 |
| 9,341,346 B1 * | 5/2016 | Wright | | F21V 17/10 |

OTHER PUBLICATIONS

Cooper Lighting; Invue; MSA Mesa LED, Product specification; Feb. 26, 2013.‡

\* cited by examiner
‡ imported from a related application

*Primary Examiner* — Anne M Hines
(74) *Attorney, Agent, or Firm* — King & Spalding LLP

(57) ABSTRACT

A luminaire can comprise a top housing fastened to a bottom housing, the top housing comprising at least one rib, the luminaire further comprising a lightguide disposed between the top housing and the bottom housing, the rib securing the lightguide against a gasket, wherein the gasket is located between the lightguide and the bottom housing, and the luminaire further comprising a light source disposed between the top housing and the bottom housing and further disposed adjacent an edge of the lightguide. The bottom housing can define an opening through which light emitted by the lightguide exits the luminaire.

20 Claims, 5 Drawing Sheets

RIBS FOR SEALING AND ALIGNING AN OUTDOOR LIGHTGUIDE LUMINAIRE

RELATED APPLICATIONS

The present application is a continuation application of and claims priority to U.S. Non-Provisional patent application Ser. No. 15/588,441, filed May 5, 2017, and titled "Ribs For Sealing And Aligning An Outdoor Lightguide Luminaire," which claims priority to U.S. Provisional Patent Application No. 62/332,437, filed May 5, 2016, and titled "Ribs for Sealing and Aligning An Outdoor Lightguide Luminaire". The entire contents of the foregoing applications are incorporated herein by reference.

TECHNICAL FIELD

Embodiments of the technology relate generally to illumination systems and more particularly to an outdoor luminaire with a lightguide.

BACKGROUND

As compared to incandescent and fluorescent light sources, light emitting diodes (LEDs) offer substantial potential benefit associated with their energy efficiency, light quality, and compact size. However, to realize the full potential benefits offered by light emitting diodes, new technologies are needed.

For instance, there are needs in the art for technology to utilize light emitting diodes for illumination. Need exists for light-emitting-diode-based systems that can align light emitting diodes with an edge of a lightguide for illumination. Need also exists for LED-based luminaires that can be sealed for use in outdoor environments. A capability addressing one or more such needs, or some other related deficiency in the art, would support improved illumination and more widespread utilization of light emitting diodes in lighting applications.

SUMMARY

The present disclosure is directed to an outdoor lightguide luminaire comprising a lightguide sealed between a top housing and a bottom housing. The lightguide can be sealed between the top housing and the bottom housing using a gasket positioned between the bottom housing and the lightguide. An outer seal can be disposed between an outer perimeter of the top housing and an outer perimeter of the bottom housing. The top housing comprises at least one rib that projects downward and secures the lightguide against the gasket to form a seal. The rib also maintains an alignment between a perimeter edge surface of the lightguide and one or more light sources in order to maximize the amount of light that enters the lightguide and minimize light losses. A wire tray is disposed between the top housing and the lightguide and comprises one or more apertures through which the one or more ribs pass to secure the lightguide in the proper alignment and to maintain the seal with the gasket.

The foregoing and other alternate embodiments are encompassed by the non-limiting examples described herein.

BRIEF DESCRIPTION OF THE FIGURES

Reference will be made below to the accompanying drawings.

Figure 1:
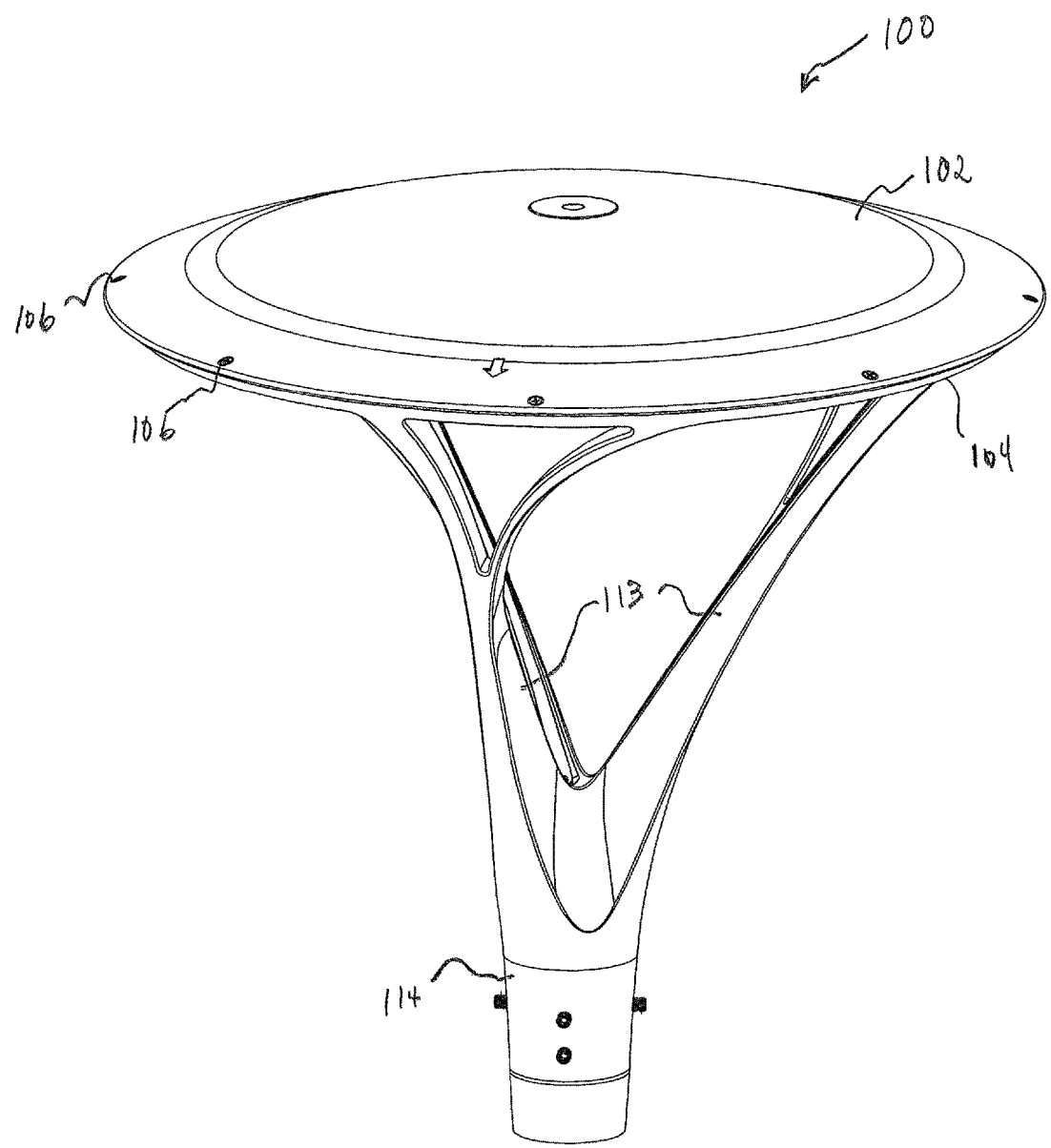
FIG. 1 is a top perspective view of an outdoor lightguide luminaire in accordance with an example embodiment of the disclosure.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positions may be exaggerated to help visually convey certain principles. In the drawings, similar reference numerals among different figures designate like or corresponding, but not necessarily identical, elements.

DETAILED DESCRIPTION OF EXAMPLE EMBODIMENTS

The example outdoor lightguide luminaires described in this disclosure use a lightguide for transmitting light. A lightguide can comprise a panel, slab, plate, or related form that can be flat or curved and that comprises two major faces that are internally reflective. Light can be introduced into the lightguide from at one or more edge surfaces of the lightguide, so that the major faces guide the light toward a side of the lightguide that is opposite the edge surface where the light entered the lightguide. One or both of the major faces can have features that provide a controlled release of light flowing through the lightguide, to illuminate an area. Light can thus propagate in the lightguide via internal reflection from the two major faces, traveling from the light-source edge towards an opposing edge, and illumination light can escape from the lightguide through the major faces and the opposing edge. A light source can be positioned adjacent the first edge of the lightguide, so that the light source emits light into the lightguide via the first edge. LEDs are an example of the light source that can be used with the lightguide, including but not limited to discrete LEDs, arrays of LEDs, and chip-on-board LEDs.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

In certain example embodiments, the example luminaires are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. As another example, Underwriters Laboratories (UL) sets various standards for light fixtures, including standards for heat dissipation. Use of example embodiments described herein meet (and/or allow a corresponding device to meet) such standards when required.

Any luminaire components (e.g., housings or heat sinks), described herein can be made from a single piece (e.g., as from a mold, injection mold, die cast, 3-D printing process, extrusion process, stamping process, or other prototype methods). In addition, or in the alternative, a luminaire (or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

A coupling feature (including a complementary coupling feature) as described herein can allow one or more components and/or portions of an example heat sink or other component of a light fixture to become coupled, directly or indirectly, to another portion of the example heat sink or other component of a light fixture. A coupling feature can include, but is not limited to, a snap, Velcro, a clamp, a portion of a hinge, an aperture, a recessed area, a protrusion, a slot, a spring clip, a tab, a detent, and mating threads. One portion of an example heat sink can be coupled to a light fixture by the direct use of one or more coupling features.

In addition, or in the alternative, a portion of a luminaire can be coupled using one or more independent devices that interact with one or more coupling features disposed on a component of the heat sink. Examples of such devices can include, but are not limited to, a pin, a hinge, a fastening device (e.g., a bolt, a screw, a rivet), epoxy, glue, adhesive, tape, and a spring. One coupling feature described herein can be the same as, or different than, one or more other coupling features described herein. A complementary coupling feature (also sometimes called a corresponding coupling feature) as described herein can be a coupling feature that mechanically couples, directly or indirectly, with another coupling feature.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
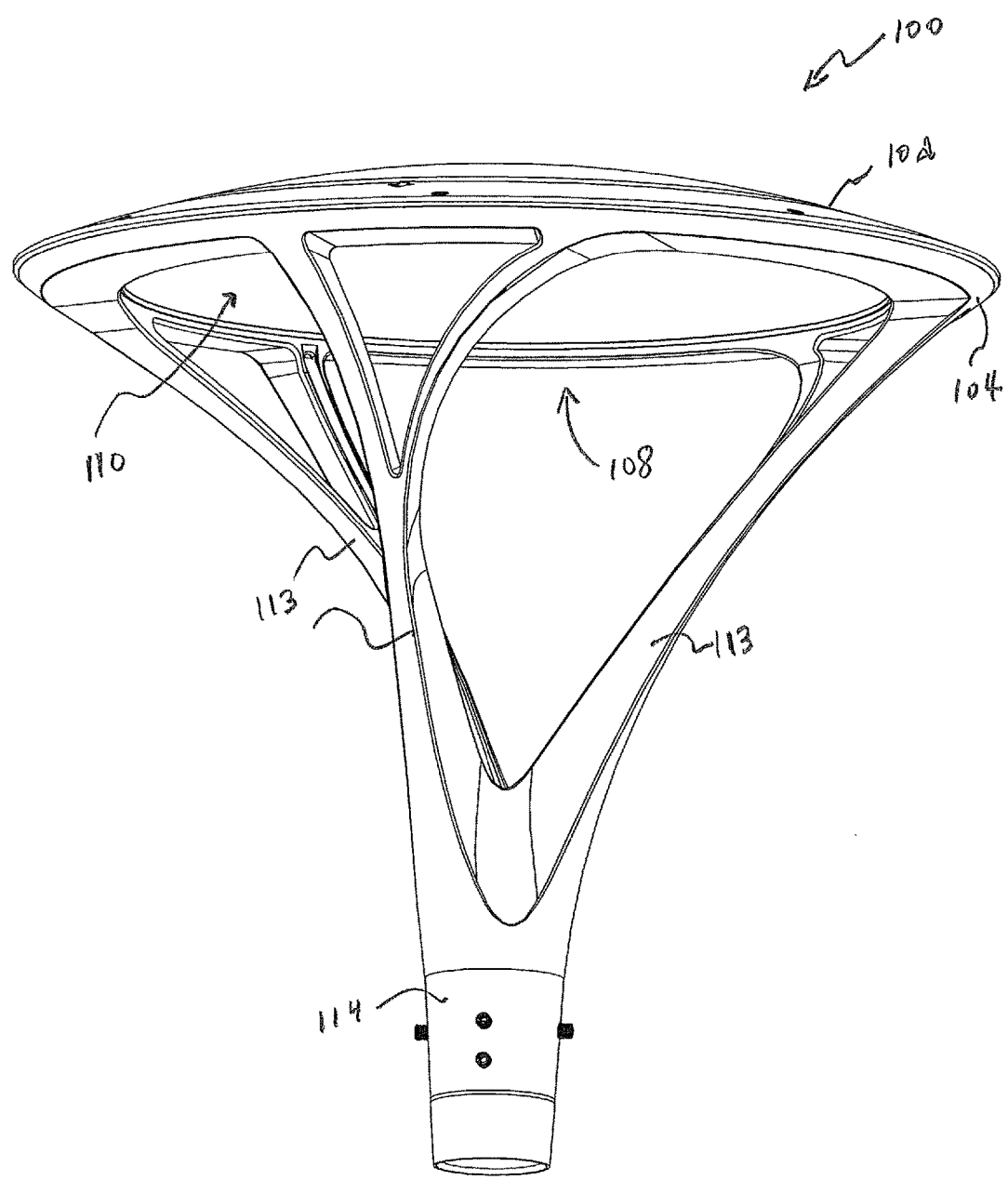
FIG. 2 is a bottom perspective view of the outdoor lightguide luminaire in accordance with an example embodiment of the disclosure.

Referring now to FIGS. 1 and 2, an example outdoor lightguide luminaire 100 is illustrated. The outdoor lightguide luminaire comprises a top housing 102 and a bottom housing 104 fastened together with fasteners 106 and mounted on a post (not shown in FIGS. 1 and 2). Within the top housing and the bottom housing are located the components of the luminaire. The bottom housing 104 includes an aperture 108 through which the lightguide 110 is visible and through which the lightguide 110 emits light to illuminate an area below the luminaire 100 such as a sidewalk. The bottom housing 104 is attached to one or more supports 113 that connect the bottom housing 104 to a base 114. The one or more supports 113 and the base 114 can be formed as one integral component with the bottom housing 104 or they can be discrete components that are attached to the bottom housing 104. While three supports 113 are shown in FIGS. 1 and 2, in other embodiments a different number of supports can be used.

Figure 3:
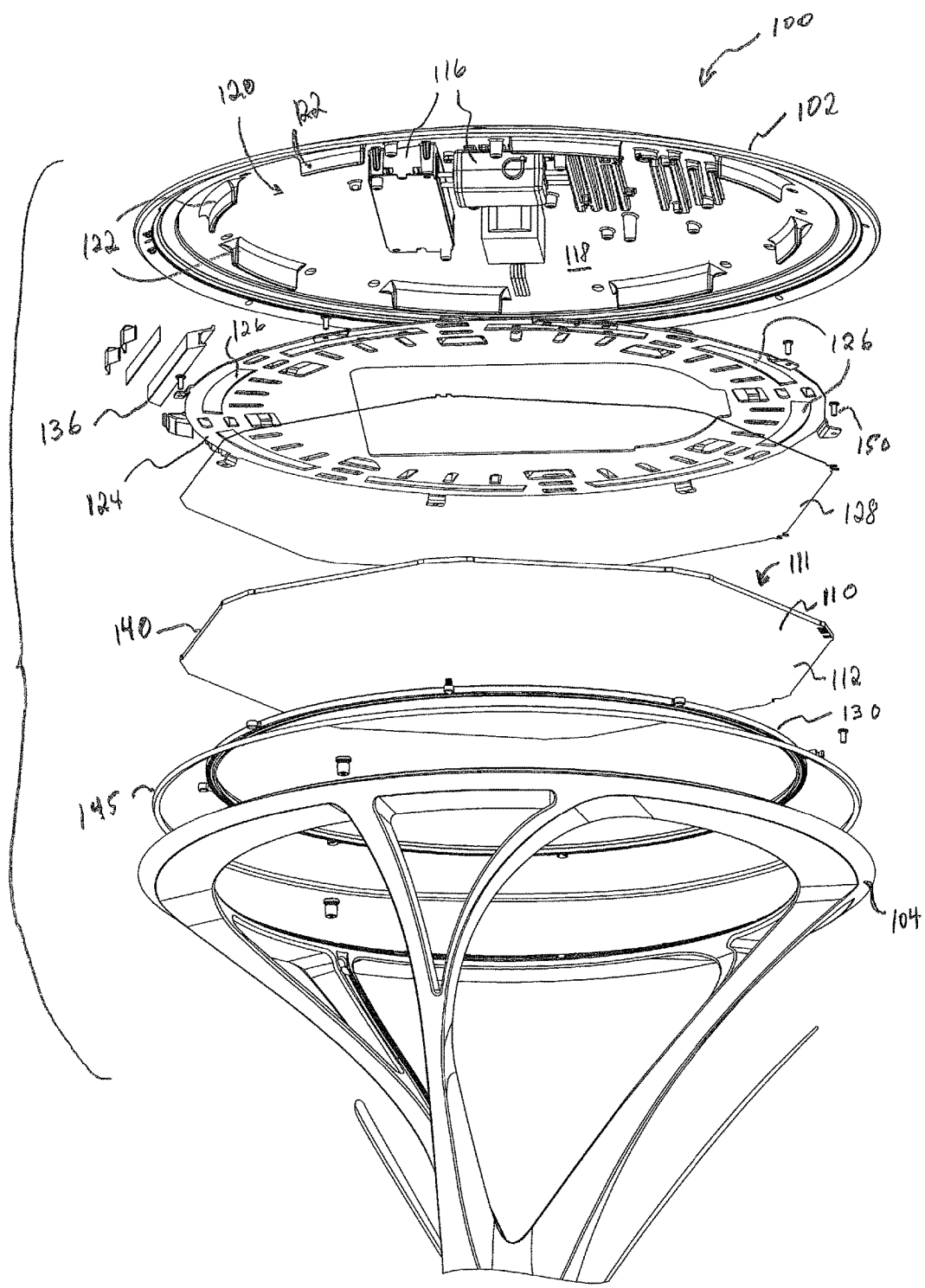
FIG. 3 is an exploded view of the outdoor lightguide luminaire in accordance with an example embodiment of the disclosure.
Figure 4:
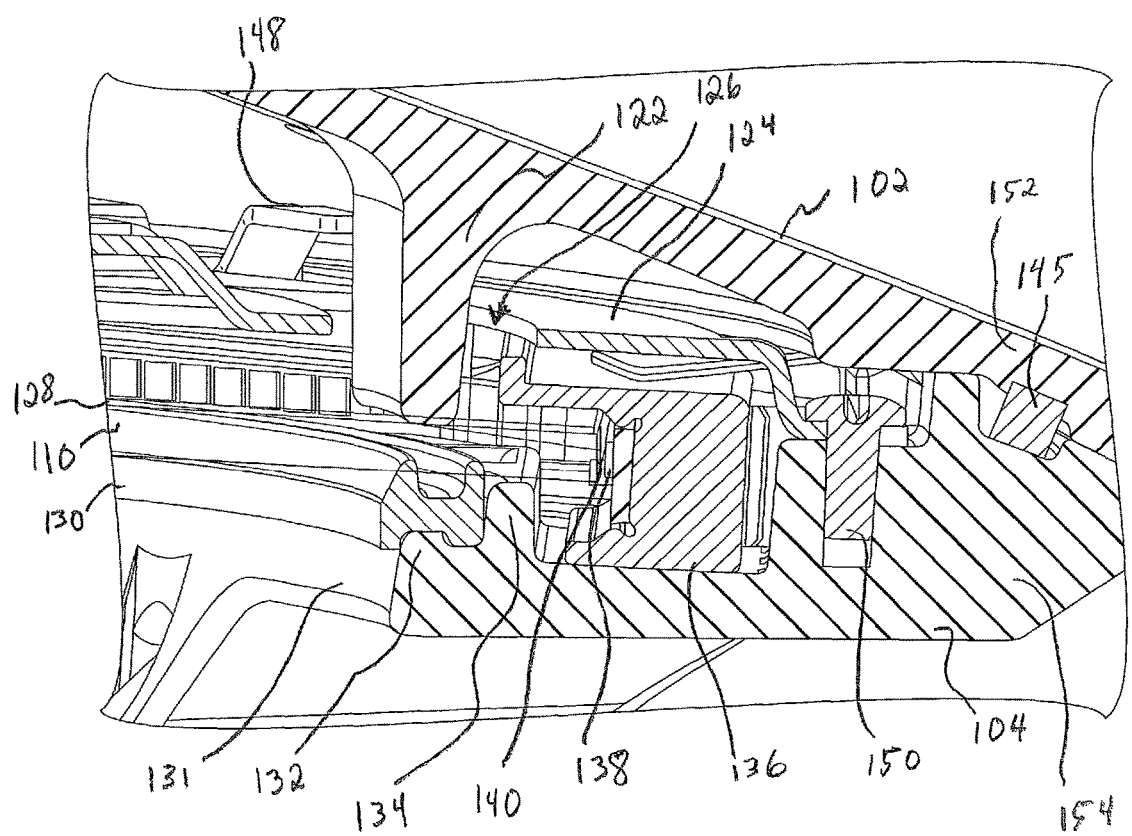
FIG. 4 is a close-up cross-sectional view of a portion of the outdoor lightguide luminaire in accordance with an example embodiment of the disclosure.
Figure 5:
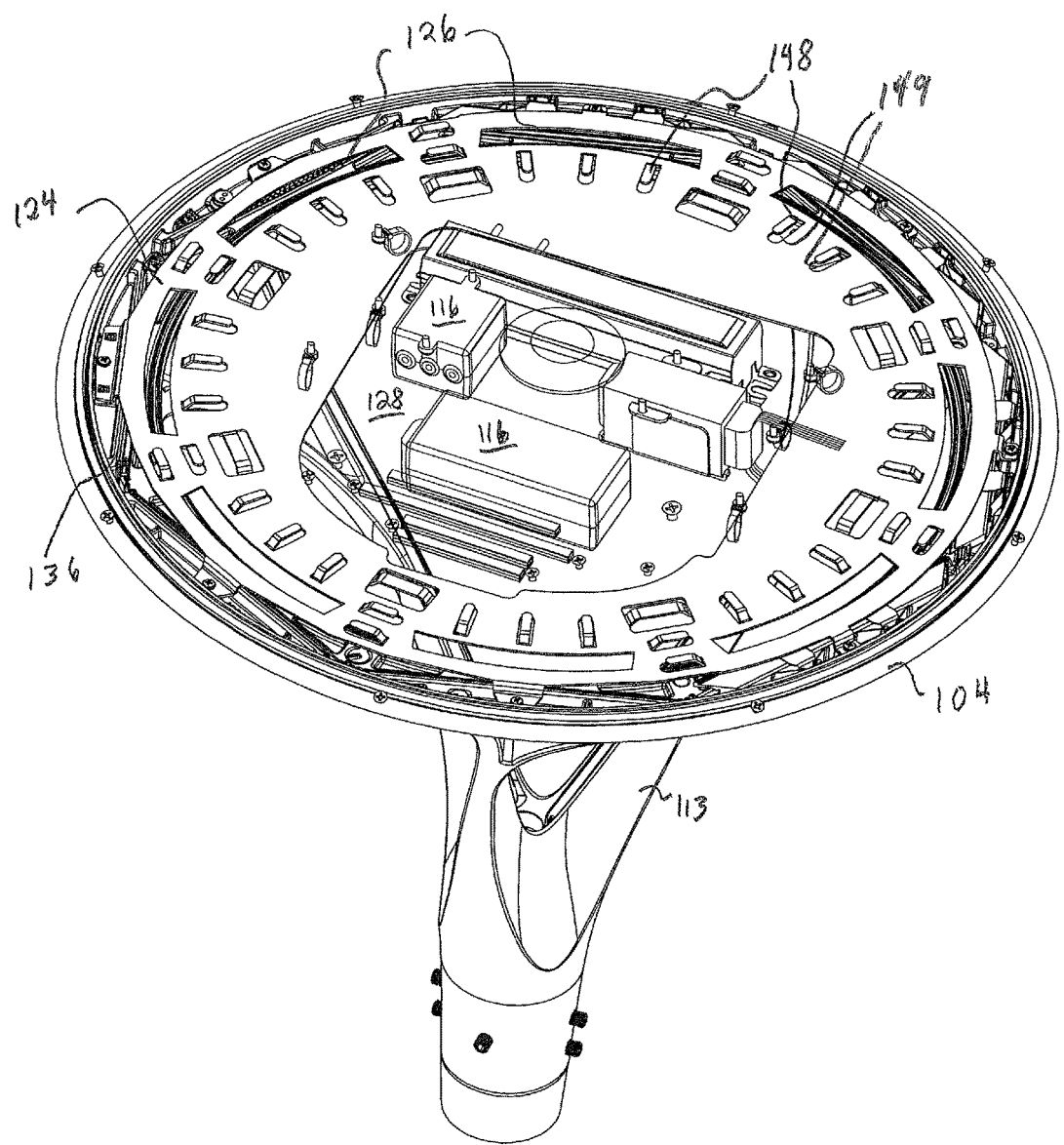
FIG. 5 is a top perspective view of the outdoor lightguide luminaire with the top housing made transparent in accordance with an example embodiment of the disclosure.

Referring now to FIGS. 3-5, further details of the internal components of the example outdoor lightguide luminaire 100 are shown. The top housing 102 includes power supply modules 116 attached to an inner surface 118 of the top housing 102. For example, the power supply modules 116 can include one or more drivers that supply power to the LEDs of the luminaire 100. In the example shown in FIGS. 3-5, the inner surface 118 of the top housing 102 defines a concave region 120 in which the power supply modules 116 are mounted.

Also located on the inner surface 118 of the top housing 102 are a series of ribs 122. When the luminaire 100 is assembled, as best seen in FIG. 4, the ribs 122 of the top housing 102 pass through apertures 126 in a wire tray 124 so that the ribs 122 can engage a reflector 128 located on top of the top major surface 111 of the lightguide 110. On the opposite side of the lightguide 110 is the bottom major surface 112 and located between the bottom major surface 112 of the lightguide 110 and the bottom housing 104 is a gasket 130. When the ribs 122 engage the reflector 128 located on the top major surface 111 of the lightguide 110, the ribs 122 maintain a seal between the gasket 130 and the bottom major surface 112 of the lightguide 110 so that moisture and other external elements cannot enter the inner portion of the luminaire 100. As shown in the example in FIGS. 3 and 4, the ribs 122 are located in a circular pattern around the periphery of the top housing 102 in order to provide even compression of the lightguide 110 against the gasket 130. Alternate embodiments of the disclosure can use a varying number of ribs, ribs having different shapes, and ribs located in various positions on the top housing 102.

The ribs 122 also perform a second function in that they ensure the lightguide 110 is properly aligned with one or more light modules 136 located along the periphery of the lightguide 110. As best seen in FIG. 4, the light module 136 includes one or more LEDs 138 that are oriented to direct light into the perimeter edge surface 140 of the lightguide 110. Proper alignment of the LEDs 138 with the perimeter edge surface 140 of the lightguide 110 minimizes light losses. Light emitted by the LEDs 138 travels into the perimeter edge surface 140 of the lightguide 110, through the lightguide 110 and then exits through the bottom major surface 112 of the lightguide 110 and through the aperture 108 in the bottom housing 104.

The example shown in FIGS. 1-5 includes a reflector 128 positioned on the top major surface 111 of the lightguide 110 so that light exiting the top major surface 111 of the lightguide 110 is directed by the reflector 128 back into the lightguide 110. In alternate embodiments of the disclosure, a reflector may not be included. For example, alternate embodiments of the disclosure may include a top housing with an aperture designed so that light exits the top major surface 111 of the lightguide 110 and then exits the top of the luminaire through the aperture in the top housing. Additionally, the example shown in FIGS. 1-5 includes multiple light modules located along the perimeter of the lightguide. In alternate embodiments of the disclosure, a single light module can be used.

The example outdoor lightguide luminaire 100 shown in FIGS. 1-5 also includes a wire tray 124 for securing and routing electrical wiring from the power supplies 116 to the light modules 136. The wire tray 124 can ensure that wiring is not pinched by the ribs 122 or the other internal features of the luminaire. The wire tray 124 is located between the power supplies 116 attached to the top housing 102 and the lightguide 110. The wire tray 124 can be fastened to the bottom housing 104 using fasteners 150 as shown in FIG. 4. As referenced above, the wire tray 124 includes apertures 126 that permit the ribs 122 to pass through the wire tray 124 and engage the reflector 128 located on top of the top major surface 111 of the lightguide 110. The wire tray 124 also includes a series of flanges 148 and apertures 149 for safely routing wires from the power supplies 116 to the light modules 136.

Referring again to FIG. 4, further details of the inner cavity of the luminaire 100 can be seen that enable the sealing and aligning advantages described herein. For example, the bottom housing 104 comprises a first inner protrusion 132 and a second inner protrusion 134. The first inner protrusion 132 is located along an inner perimeter 131 of the bottom housing 104. The first inner protrusion 132 and second inner protrusion 134 provide a position on which the gasket 130 can be securely mounted. The combination of the first inner protrusion 132, the second inner protrusion 134, the gasket 130, the lightguide 110 and the rib 122 create a seal along the inner portion of the luminaire 100.

A seal is also achieved along the outer perimeter of the luminaire 100. The top housing 102 comprises a top outer perimeter 152 and the bottom housing 104 comprises a bottom outer perimeter 154. An outer seal 145 is disposed between the top outer perimeter 152 and the bottom outer perimeter 154 to create a seal along the outer perimeter of the luminaire when the top housing 102 and the bottom housing 104 are fastened with fasteners 106. The bottom outer perimeter 154 has a greater thickness than the inner perimeter 131 so that the bottom outer perimeter 154 can receive fasteners 150 for securing the wire tray 124 to the bottom housing 104.

The bottom housing 104 also accommodates the one or more light modules 136 located around the bottom housing 104. Specifically, the one or more light modules 136 are secured to the bottom housing 104 between the second inner protrusion 134 and the thicker bottom outer perimeter 154. The position of the light modules 136 on the bottom housing 104 permits the light sources 138 to be properly aligned with the perimeter edge surface 140 of the lightguide 110.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:
1. A luminaire comprising:
a top housing fastened to a bottom housing, the top housing comprising a plurality of ribs;
a lightguide disposed between the top housing and the bottom housing, the plurality of ribs extending from an inner surface of the top housing and securing the lightguide against a gasket, wherein the gasket is located between the lightguide and the bottom housing; and
a light source disposed between the top housing and the bottom housing and further disposed adjacent a perimeter edge surface of the lightguide.

2. The luminaire of claim 1, further comprising a wire tray with flanges for routing of electrical wires from at least one power supply to the light source.

3. The luminaire of claim 2, wherein the wire tray comprises at least one aperture through which the plurality of ribs pass to secure the lightguide against the gasket.

4. The luminaire of claim 2, wherein the wire tray comprises a wire tray outer perimeter, the wire tray outer perimeter comprising a plurality of apertures for receiving fasteners for fastening the wire tray to the bottom housing.

5. The luminaire of claim 2, wherein the wire tray is fastened to the bottom housing.

6. The luminaire of claim 2, wherein the wire tray comprises a central aperture through which light can pass from the lightguide.

7. The luminaire of claim 1, wherein the bottom housing comprises an aperture through which light from the lightguide is emitted from the luminaire.

8. The luminaire of claim 1, wherein the luminaire can be mounted on a post.

9. The luminaire of claim 1, wherein the plurality of ribs maintain alignment between the light source and the perimeter edge surface of the lightguide so that light emitted by the light source enters the perimeter edge surface of the lightguide.

10. The luminaire of claim 1, wherein an outer perimeter of the top housing and an outer perimeter of the bottom housing are circular.

11. The luminaire of claim 1, further comprising an outer seal disposed between an outer perimeter of the top housing and an outer perimeter of the bottom housing.

12. The luminaire of claim 1, wherein the perimeter edge surface of the lightguide is disposed between a top major surface and a bottom major surface of the lightguide.

13. The luminaire of claim 1, wherein an inner surface of the top housing defines a concavity in which a power supply is disposed.

14. The luminaire of claim 1, wherein the light source is further disposed outside a perimeter of the gasket and within a perimeter of an outer seal.

15. The luminaire of claim 1, wherein the light source comprises one or more light emitting diodes disposed to direct light into the perimeter edge surface of the lightguide.

16. A luminaire comprising:
a top housing fastened to a bottom housing, the top housing comprising a rib;
a lightguide disposed between the top housing and the bottom housing;
a reflector located on a top surface of the lightguide, wherein the rib engages the reflector and secures the lightguide against the bottom housing; and
a light source disposed between the top housing and the bottom housing and further disposed adjacent a perimeter edge surface of the lightguide.

17. The luminaire of claim 16, wherein the bottom housing comprises an aperture through which light from the lightguide is emitted from the luminaire.

18. The luminaire of claim 16, wherein one or more supports connect the bottom housing to a base of the luminaire.

19. The luminaire of claim 16, wherein the rib maintains alignment between the light source and the perimeter edge surface of the lightguide so that light emitted by the light source enters the perimeter edge surface of the lightguide.

20. The luminaire of claim 16, wherein an inner surface of the top housing defines a concavity in which a power supply is disposed.

\* \* \* \* \*